United States Patent
Morin et al.

(10) Patent No.: US 11,587,156 B2
(45) Date of Patent: Feb. 21, 2023

(54) INCLUDING CONTENT CREATED BY AN ONLINE SYSTEM USER IN A PAGE ASSOCIATED WITH AN ENTITY AND/OR ADDING DATA TO THE CONTENT BASED ON A MEASURE OF QUALITY OF AN IMAGE INCLUDED IN THE CONTENT

(71) Applicant: Meta Platforms, Inc., Menlo Park, CA (US)

(72) Inventors: Steve Morin, San Francisco, CA (US); Xuewei Ouyang, San Francisco, CA (US); Martin Mroz, San Francisco, CA (US); Anuj Madan, San Mateo, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 341 days.

(21) Appl. No.: 16/880,834

(22) Filed: May 21, 2020

(65) Prior Publication Data

US 2021/0366031 A1    Nov. 25, 2021

(51) Int. Cl.
*G06Q 30/00* (2012.01)
*G06Q 30/0601* (2023.01)
*G06T 7/70* (2017.01)
*G06V 10/25* (2022.01)
*G06Q 50/00* (2012.01)

(52) U.S. Cl.
CPC ........ *G06Q 30/0643* (2013.01); *G06Q 50/01* (2013.01); *G06T 7/70* (2017.01); *G06V 10/25* (2022.01); *G06T 2207/30168* (2013.01)

(58) Field of Classification Search
CPC ...... G06Q 30/0643; G06Q 50/01; G06T 7/70; G06T 2207/30168; G06V 10/25
See application file for complete search history.

(56) References Cited

U.S. PATENT DOCUMENTS

| | | | |
|---|---|---|---|
| 9,754,163 | B2 | 9/2017 | Segalovitz et al. |
| 10,546,352 | B2 | 1/2020 | Systrom et al. |
| 2014/0279068 | A1 | 9/2014 | Systrom et al. |
| 2018/0300757 | A1 | 10/2018 | Saxena et al. |

OTHER PUBLICATIONS

European Search Report for European Application No. 21175118.5, dated Oct. 11, 2021, 3 pages.

*Primary Examiner* — Qian Yang
(74) *Attorney, Agent, or Firm* — Fenwick & West LLP

(57) ABSTRACT

An online system receives a content item including an image from an online system user. The online system accesses and applies a trained item detection model to predict a probability that a region of interest within the image corresponds to an item associated with an entity based on a set of pixel values associated with the region of interest. If the probability is at least a threshold probability, the online system accesses and applies a trained quality prediction model to predict a measure of quality of the image based on a set of attributes of the image. If the measure of quality is at least a threshold measure of quality, the online system includes the content item in a page associated with the entity maintained in the online system and/or adds a set of data associated with the item and/or the entity to the content item.

20 Claims, 3 Drawing Sheets

INCLUDING CONTENT CREATED BY AN ONLINE SYSTEM USER IN A PAGE ASSOCIATED WITH AN ENTITY AND/OR ADDING DATA TO THE CONTENT BASED ON A MEASURE OF QUALITY OF AN IMAGE INCLUDED IN THE CONTENT

TECHNICAL FIELD

This disclosure relates generally to online systems, and more specifically to including content created by an online system user in a page associated with an entity and/or adding data to the content based on a measure of quality of an image included in the content.

BACKGROUND

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for allowing users to share content by creating content items for presentation to additional online system users. For example, users may share photos or videos they have uploaded by creating content items that include the photos or videos that are presented to additional users to whom they are connected in the online system.

Content items created by online system users may include images of various items (e.g., products) that are associated with entities (e.g., merchants) having a presence on an online system. For example, a user of an online system may create a content item that includes an image of a purse that is associated with a merchant that offers the purse for sale. Entities associated with the items may derive a benefit from the content items if tags added to the content items include information about the items and/or the entities. In the above example, a tag added to the content item may include a brand and model of the purse, a price of the purse, and a link to purchase the product on the merchant's web site. In this example, information included in the tag may be displayed to an online system user being presented with the content item when the user performs an interaction with the content item, allowing the user to easily obtain the information. Entities associated with the items also may derive a benefit from the content items if the images of the items are high-quality images (e.g., high resolution images that feature the items). In the above example, if the online system maintains a page associated with the merchant, to promote the purse, content items created by online system users that include high-quality images of the purse may be included in the page, such that online system users who view the content items in the page may be more likely to purchase the purse.

However, since online systems conventionally require tags to be manually added to content items, adding tags to content items may be a time-consuming and resource-intensive process. For example, if a content item includes an image of different products, to manually add tags to the content item that include information about the products, an online system user may compare the image of each product to images of different products included in a product catalog and manually adds tags to the content item that include information about products in the product catalog matching products in the content item. Thus, online system users may forego adding tags to content items including images of items, limiting the dissemination of information about the items and/or entities associated with the items.

Furthermore, since several factors may be considered when identifying content items including images of specific items and when subsequently evaluating the quality of the images, identifying content items including high-quality images of these items also may be a time-consuming and resource-intensive process. For example, since content items may include images of different items that are very similar in appearance, manual review of the images may be required to identify content items including images of a specific item. In the above example, once these content items are identified, since various characteristics of the images that may affect their quality may vary greatly (e.g., based on their resolutions and sizes, based on the percentages of the images that the item occupies, based on the number of items associated with other entities that also may be included in the images, etc.), manual review of the images also may be required to evaluate their quality. Thus, since it may be difficult to easily identify content items including high-quality images of specific items, entities associated with the items may not derive any benefit from these content items.

SUMMARY

Content items created by online system users may include images of various items (e.g., products) that are associated with entities (e.g., merchants) having a presence on an online system. Entities associated with the items may derive a benefit from such content items if tags added to the content items include information about the items and/or the entities and/or if the images of the items are high-quality images. However, since online systems conventionally require tags to be manually added to content items, adding tags to content items may be a time-consuming and resource-intensive process. Furthermore, since several factors may be considered when identifying content items including images of specific items and when subsequently evaluating the quality of the images, identifying content items including high-quality images of these items also may be a time-consuming and resource-intensive process. As a result, online system users may forego adding tags to content items including images of items, limiting the dissemination of information about the items and/or entities associated with the items. Moreover, since it may be difficult to easily identify content items including high-quality images of specific items, entities associated with the items may not derive any benefit from these content items.

To allow entities associated with items to derive a benefit from content items including high-quality images of the items, an online system includes content created by an online system user in a page associated with an entity and/or adds data to the content based on a measure of quality of an image included in the content. More specifically, the online system receives a content item including an image from an online system user. The online system accesses and applies a trained item detection model to predict a probability that a region of interest within the image corresponds to an item associated with an entity based on a set of pixel values associated with the region of interest. If the probability is at least a threshold probability, the online system accesses and applies a trained quality prediction model to predict a measure of quality of the image based on a set of attributes of the image. If the measure of quality is at least a threshold measure of quality, the online system includes the content item in a page associated with the entity maintained in the online system and/or adds a set of data associated with the item and/or the entity to the content item.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
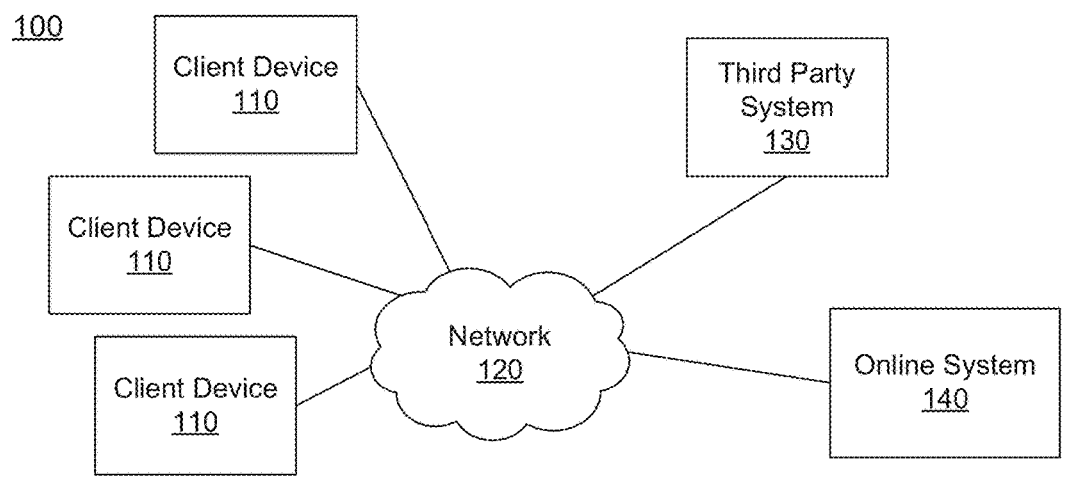
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
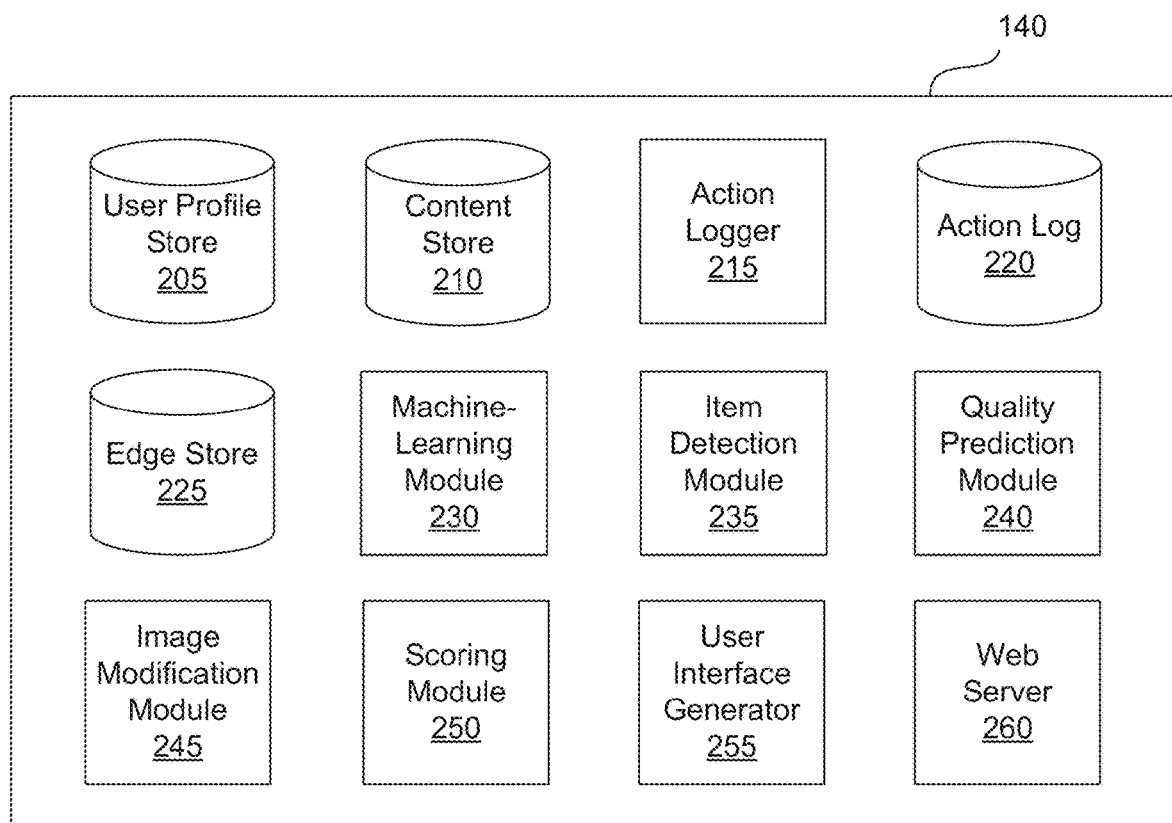
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a machine-learning module 230, an item detection module 235, a quality prediction module 240, an image modification module 245, a scoring module 250, a user interface generator 255, and a web server 260. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image, with information identifying the images in which a user is tagged stored in the user profile of the user. A user profile in the user profile store 205 also may maintain references to actions by the corresponding user performed on content items in the content store 210 and stored in the action log 220.

While user profiles in the user profile store 205 frequently are associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., a brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The machine-learning module 230 may train an item detection model to predict a probability that a region of interest within an image corresponds to an item associated with an entity having a presence on the online system 140. In some embodiments, the machine-learning module 230 also or alternatively may train the item detection model to predict a probability that one or more regions of interest within an image correspond(s) to an item associated with an entity having a presence on the online system 140 that is being used. Examples of items include products such as clothing items, electronic items, shoes, cars, or any other suitable types of items. Examples of entities associated with an item may include a manufacturer of the item, a merchant of the item, a distributor of the item, etc. The item detection model may be a convolutional neural network, a deep learning model, or any other suitable machine-learning model. In some embodiments, the machine-learning module 230 may train multiple machine-learning models that collectively predict a probability that a region of interest within an image corresponds to an item associated with an entity having a presence on the online system 140. In various embodiments, the machine-learning module 230 also or alternatively may train multiple machine-learning models that collectively predict a probability that one or more regions of interest within an image correspond(s) to an item associated with an entity having a presence on the online system 140 that is being used.

The machine-learning module 230 may train the item detection model based on a training set of images of one or more items associated with one or more entities having a presence on the online system 140, in which some of the training set of images include images of items associated with the entity/entities and some of the training set of images do not. The machine-learning module 230 also may train the item detection model based on a set of pixel values associated with each of the training set of images, as well as information indicating whether each of the training set of images corresponds to an item associated with an entity having a presence on the online system 140. A set of pixel values associated with an image may describe a size of the image, a resolution of the image, a brightness of one or more pixels within the image, red, green and blue color component intensities of one or more pixels within the image, etc.

The machine-learning module 230 also may train the item detection model based on a training set of images of one or more items associated with one or more entities having a presence on the online system 140, in which some of the training set of images depict items associated with the entity/entities being used and some of the training set of images do not. For example, if an item associated with an entity having a presence on the online system 140 is a car, the training set of images may include images of the car not being used. In this example, the images may be included in a catalog of products received from the entity, in which each image depicts the car parked at a different location. In the above example, the training set of images also may include lifestyle images received from content-providing users of the online system 140, in which the lifestyle images depict the content-providing users using the car (e.g., by sitting in the car, driving the car, washing the car, etc.). In embodiments in which the item detection model is trained based on one or more images depicting an item being used as well as one or more images depicting an item not being used, the machine-learning module 230 also may train the item detection model based on information indicating whether each of the training set of images depicts an item being used.

In embodiments in which the machine-learning module 230 trains the item detection model based on information indicating whether each of the training set of images depicts an item being used, the machine-learning module 230 may determine that an image depicts an item being used based on various types of information. Examples of such information include information indicating that one or more bodies and/or body parts (e.g., facial features, ears, arms, legs, hands, feet, etc.) of one or more individuals using the item are included in the image, information indicating that one or more online system users using the item are tagged in the image, information in a caption and/or a comment associated with a content item that includes the image indicating that the image depicts the item being used, etc. For example, suppose that an item associated with an entity having a presence on the online system 140 is a pair of shoes and that the training set of images includes an image of a content-providing user of the online system 140 wearing the shoes. In this example, the machine-learning module 230 may determine that the image depicts the item being used if a caption associated with a content item including the image received from the content-providing user indicates that the image depicts the content-providing user wearing the shoes and if one or more legs of the content-providing user also are included in the image.

In some embodiments, once trained, the item detection model may first detect one or more objects within an image (e.g., an image included in one or more frames of a video). The item detection model may do so by applying one or more object detection methods to the image. The item detection model also may identify locations of objects detected within an image (e.g., by generating a bounding box surrounding each object). In some embodiments, the item detection model uses one or more object detection methods to detect objects within an image and to generate bounding boxes corresponding to each of the detected objects. In such embodiments, a bounding box may correspond to a region of interest within the image. A bounding box may be defined by coordinates representing a corner of the bounding box (e.g., an x-coordinate and a y-coordinate of the top-left corner), as well as a width and a height of the bounding box.

When detecting objects included in an image, the item detection model also may identify a topic (e.g., categories or types of products or other items) corresponding to each object detected within the image based on attributes of the object. For example, an object detection method applied by the item detection model associates different topics with objects based on attributes of the objects and the item detection model associates a topic from the object detection method with a detected object. In this example, if an object detected within an image corresponds to a sports car of a specific make and model, based on attributes of the object (e.g., headlights, a windshield, four wheels, one or more side-view mirrors, etc.), an object detection method applied by the item detection model may associate the object with the topic of cars.

In embodiments in which the item detection model identifies a topic associated with each object detected within an image included in a content item, the machine-learning module 230 may train the item detection model based on a training set of images including images of items associated with different topics. In some embodiments, the training set of images may include publicly available information identifying different topics associated with images of various items. The item detection model also may be trained based on attributes that characterize each of the training set of images, as well as information indicating a topic associated with an item corresponding to each of the training set of images. Examples of attributes that characterize an image include shapes, edges, curves, textures, etc. detected within the image, components of various categories/types of items (e.g., surfaces, handles, wheels, fasteners, etc.), or any other suitable attributes that may characterize an image.

In some embodiments, once trained, the item detection model also may make one or more predictions that each correspond to a probability that an object detected within an image corresponds to a specific item associated with an entity having a presence on the online system 140. The item detection model may make each prediction by comparing each object detected within an image to images of items (e.g., images of products included in a product catalog) associated with one or more entities having a presence on the online system 140. The item detection model then outputs one or more probabilities that each object detected within an image matches different items associated with one or more entities having a presence on the online system 140.

In embodiments in which the item detection model predicts a probability that an object detected within an image corresponds to a specific item associated with an entity having a presence on the online system 140, the machine-learning module 230 may train the item detection model based on comparisons of objects detected within images to images of items associated with one or more entities having a presence on the online system 140. In some embodiments, the machine-learning module 230 trains the item detection model to predict a probability that an object detected within an image matches an item associated with an entity having a presence on the online system 140 based on prior matching of objects detected within images to different items associated with entities having a presence on the online system 140. For example, the machine-learning module 230 applies a label to an object detected within an image indicating that the object matches an item associated with an entity based on attributes of the object (e.g., logos, trademarks, emblems, icons, patterns, prints, etc.). From the labeled attributes of objects extracted from images, the machine-learning module 230 trains the item detection model using any suitable training method or combination of training methods (e.g., back propagation if the item detection model is a neural network, curve fitting techniques if the item detection model is a linear regression model, etc.).

In some embodiments, once trained, the item detection model also or alternatively may make one or more predictions that each correspond to a probability that one or more objects detected within an image correspond(s) to a specific item associated with an entity having a presence on the online system 140 that is being used. The item detection model may make each prediction by comparing one or more objects detected within an image to images of items associated with one or more entities having a presence on the online system 140 being used (e.g., lifestyle images of products being used by individuals included in content items received from content-providing users of the online system 140). The item detection model then outputs one or more probabilities that the object(s) detected within an image match(es) different items associated with one or more entities having a presence on the online system 140 being used.

In embodiments in which the item detection model predicts a probability that one or more objects detected within an image correspond(s) to a specific item associated with an entity having a presence on the online system 140 that is being used, the machine-learning module 230 may train the item detection model based on comparisons of objects detected within images to images of items associated with one or more entities having a presence on the online system 140 that are being used. In some embodiments, the machine-learning module 230 trains the item detection model to predict a probability that one or more objects detected within an image match(es) an item associated with an entity having a presence on the online system 140 that is being used based on prior matching of objects detected within images to different items associated with entities having a presence on the online system 140 being used. For example, the machine-learning module 230 applies a label to a set of objects detected within an image indicating that the set of objects matches an item associated with an entity being used based on attributes of the set of objects (e.g., logos, trademarks, emblems, icons, patterns, prints, facial features, hands, feet, arms, legs, etc.). In this example, the set of objects may be within a threshold distance of each other or may be surrounded by a corresponding set of bounding boxes that overlap each other. As described above, from the labeled attributes of objects extracted from images, the machine-learning module 230 trains the item detection model using any suitable training method or combination of training methods (e.g., back propagation if the item detection model is a neural network, curve fitting techniques if the item detection model is a linear regression model, etc.).

The machine-learning module 230 also may train a quality prediction model to predict a measure of quality of an image. The quality prediction model may be a convolutional neural network, a deep learning model, or any other suitable machine-learning model and may be trained using any suitable image classification algorithm that analyzes images. In some embodiments, the machine-learning module 230 may train multiple machine-learning models that collectively predict a measure of quality of an image. In some embodiments, the machine-learning module 230 may train the quality prediction model based on a training set of images of different measures of quality. In such embodiments, the machine-learning module 230 also may train the quality prediction model based on a set of attributes of each of the training set of images, as well as a measure of quality of each of the training set of images.

Various types of attributes of an image included among a training set of images may be used to train the quality prediction model. In some embodiments, one or more attributes of an image used to train the quality prediction model may include a resolution of the image, a brightness of the image, an amount of noise characterizing the image, an amount of contrast characterizing the image, an amount of distortion characterizing the image, etc. In some embodiments, one or more attributes of an image that may be used to train the quality prediction model may be specific to an entity having a presence on the online system 140. In such embodiments, the attribute(s) may include a percentage of the images corresponding to an item associated with the entity, a number of items associated with one or more additional entities having a presence on the online system 140 included in the image, etc. In various embodiments, one or more images used to train the quality prediction model may be included in one or more content items maintained in the online system 140. In such embodiments, attributes of an image that may be used to train the quality prediction model also may include an amount of user engagement with a link included in the same content item. The functionality of the machine-learning module 230 is further described below in conjunction with FIG. 3.

The item detection module 235 accesses (e.g., as shown in step 310 of FIG. 3) the trained item detection model and applies (e.g., as shown in step 315 of FIG. 3) the item detection model to predict a probability that a region of interest within an image corresponds to an item associated with an entity having a presence on the online system 140. In some embodiments, the item detection model may be trained by the machine-learning module 230, while in other embodiments, the item detection model may be trained by a third-party system 130. To apply the item detection model to predict a probability that a region of interest within an image corresponds to an item associated with an entity having a presence on the online system 140, the item detection module 235 provides an input to the item detection model that includes a set of pixel values associated with the region of interest. As described above, in some embodiments, a region of interest within an image corresponds to a bounding box generated by the item detection model, in which the bounding box surrounds each object identified by the item detection model. Based on the set of pixel values associated with the region of interest, the item detection model predicts a probability that the region of interest corresponds to an item associated with an entity. The item detection module 235 then receives an output from the item detection model corresponding to the predicted probability.

In various embodiments, the item detection module 235 also or alternatively may access and apply the item detection model to predict a probability that one or more regions of interest within an image correspond(s) to an item associated with an entity having a presence on the online system 140 that is being used. In such embodiments, to apply the item detection model, the item detection module 235 may provide an input to the item detection model that includes a set of pixel values associated with the region(s) of interest (e.g., a set of pixel values associated with a region of interest and pixels within a threshold distance of the region of interest, a set of pixel values associated with multiple regions of interest corresponding to overlapping bounding boxes, etc.). Based on the set of pixel values, the item detection model predicts a probability that the region(s) of interest correspond(s) to an item associated with an entity that is being used. In some embodiments, to apply the item detection model to predict a probability that one or more regions of interest within an image correspond(s) to an item associated with an entity having a presence on the online system 140 that is being used, the input provided by the item detection module 235 also may include other types of information, such as information indicating that one or more online system users are tagged in the image, information in a caption and/or a comment associated with a content item that includes the image, etc. The item detection module 235 then receives an output from the item detection model corresponding to the predicted probability. In some embodiments, the item detection module 235 may access and apply multiple machine-learning models that collectively perform the function of the item detection model.

Once the item detection module 235 has applied the item detection model to predict a probability that a region of interest within an image corresponds to an item associated with an entity having a presence on the online system 140, the item detection module 235 determines (e.g., as shown in step 320 of FIG. 3) whether the predicted probability is at least a threshold probability. The item detection module 235 may do so by comparing the predicted probability to the threshold probability and then determining whether the predicted probability is at least the threshold probability based on the comparison. For example, suppose that an output received by the item detection module 235 from the item prediction model corresponds to an 85.1% probability that a region of interest within an image corresponds to an item associated with an entity having a presence on the online system 140. In this example, if the threshold probability corresponds to an 85% probability, the item detection module 235 determines that the predicted probability is at least the threshold probability since 85.1% is equal to or greater than 85%. Alternatively, in the above example, if the output received by the item detection module 235 from the item detection model corresponds to an 84% probability, the item detection module 235 determines that the predicted probability is less than the threshold probability since 84% is not equal to or greater than 85%. In embodiments in which the item detection module 235 applies the item detection model to predict a probability that one or more regions of interest within an image correspond(s) to an item associated with an entity having a presence on the online system 140 that is being used, the item detection module 235 may determine whether the predicted probability is at least a threshold probability in an analogous manner. The functionality of the item detection module 235 is further described below in conjunction with FIG. 3.

The quality prediction module 240 accesses (e.g., as shown in step 325 of FIG. 3) the trained quality prediction model and applies (e.g., as shown in step 330 of FIG. 3) the quality prediction model to predict a measure of quality of an image. In some embodiments, the quality prediction model may be trained by the machine-learning module 230, while in other embodiments, the quality prediction model may be trained by a third-party system 130. To apply the quality prediction model to predict a measure of quality of an image, the quality prediction module 240 provides an input to the quality prediction model that includes a set of attributes of the image. Based on the set of attributes, the quality prediction model predicts a measure of quality of the image. The quality prediction module 240 then receives an output from the quality prediction model corresponding to the predicted measure of quality. In some embodiments, the quality prediction module 240 may access and apply multiple machine-learning models that collectively perform the function of the quality prediction model.

A measure of quality of an image may be predicted by the quality prediction model based on one or more values associated with one or more attributes of the image included in an input provided to the quality prediction model. In some embodiments, one or more values associated with one or more attributes of an image may describe a resolution of the image, a brightness of the image, an amount of noise characterizing the image, an amount of contrast characterizing the image, an amount of distortion characterizing the image, etc. In various embodiments, the quality prediction module 240 applies the quality prediction model to predict a measure of quality of an image if a probability that a region of interest within the image corresponds to an item associated with an entity having a presence on the online system 140 is at least a threshold probability. In such embodiments, the value(s) associated with one or more attributes of the image also may include a percentage of the image corresponding to the item associated with the entity and/or a number of items associated with one or more additional entities having a presence on the online system 140 included in the image. In embodiments in which the quality prediction model is applied to predict a measure of quality of an image included in a content item, a value associated with an attribute of an image may describe an amount of user engagement with a link included in the content item (e.g., a link to a page associated with an entity maintained in the online system 140). In such embodiments, the value describing the amount of user engagement with the link may be retrieved by the quality prediction module 240 (e.g., from the action log 220 and/or the edge store 225).

In embodiments in which a measure of quality of an image is predicted by the quality prediction model based on one or more values associated with one or more attributes of the image included in an input provided to the quality prediction model, the predicted measure of quality of the image may be proportional or inversely proportional to one or more of the values. For example, since high resolution images are sharper and therefore more detailed than low resolution images, a predicted measure of quality of an image may be proportional to a value describing a resolution of the image. As an additional example, suppose that a probability that a region of interest within an image corresponds to an item associated with an entity having a presence on the online system 140 is at least a threshold probability. In this example, a predicted measure of quality of the image may be proportional to a percentage of the image corresponding to the item associated with the entity and inversely proportional to a number of additional items included in the image if each of the additional items is associated with a different entity having a presence on the online system 140. As yet another example, if a content item includes an image and a link, since online system users may be more likely to interact with the link if the image is a high-quality image, a predicted measure of quality of the image may be proportional to a number of clicks on the link.

Once the quality prediction module 240 has applied the quality prediction model to predict a measure of quality of an image, the quality prediction module 240 determines (e.g., as shown in step 335 of FIG. 3) whether the predicted measure of quality is at least a threshold measure of quality. The quality prediction module 240 may do so by comparing the predicted measure of quality to the threshold measure of quality and then determining whether the predicted measure of quality is at least the threshold measure of quality based on the comparison. For example, suppose that an output received from the quality prediction model corresponds to a value of a measure of quality of 75, in which the measure of quality may correspond to a value between one and 100. In this example, if the threshold measure of quality corresponds to a value of 70, the quality prediction module 240 determines that the measure of quality is at least the threshold measure of quality since 75 is equal to or greater than 70. Alternatively, in the above example, if the output received by the quality prediction module 240 corresponds to a value of 65, the quality prediction module 240 determines that the measure of quality is less than the threshold measure of quality since 65 is not equal to or greater than 70. The functionality of the quality prediction module 240 is further described below in conjunction with FIGS. 3 and 4.

The image modification module 245 may improve a measure of quality of an image. In some embodiments, the image modification module 245 may do so if the quality prediction module 240 determines that a predicted measure of quality of the image is less than a threshold measure of quality. To improve a measure of quality of an image, the image modification module 245 may modify the image in various ways, such as by cropping a portion of the image, zooming into a portion of the image, increasing a sharpness of the image, reducing an amount of noise characterizing the image, changing one or more colors within the image, changing a brightness of the image, reducing an amount of distortion characterizing the image, etc. For example, suppose that 25% of an image corresponds to an item associated with an entity having a presence on the online system 140 and that several additional items associated with other entities having a presence on the online system 140 also are included in the other 75% of the image. In this example, a measure of quality of the image may be improved by cropping the image to increase a percentage of the image corresponding to the image associated with the entity while also reducing the number of additional items associated with the other entities included in the image (e.g., by cropping out as many of the additional items as possible). In this example, once the image has been cropped, the measure of quality of the image also may be improved by increasing a sharpness of the image. The functionality of the image modification module 245 is further described below in conjunction with FIG. 3.

The scoring module 250 may compute an influencer score associated with a content-providing user of the online system 140. An influencer score associated with a content-providing user may indicate a measure of influence that the content-providing user has to drive traffic within the online system 140. In some embodiments, the scoring module 250 may compute an influencer score associated with a content-providing user if the item detection model has predicted a probability that a region of interest within an image included in a content item received from the content-providing user corresponds to an item associated with an entity having a presence on the online system 140 and if the item detection module 235 has determined that the predicted probability is at least a threshold probability.

To compute an influencer score associated with a content-providing user, the scoring module 250 may identify one or more viewing users of the online system 140 who have subscribed to content received from the content-providing user. In some embodiments, the scoring module 250 may only identify viewing users who satisfy a set of targeting criteria received from an entity specifying an audience for content associated with the entity. Targeting criteria may include demographic information, information describing hobbies/interests, information describing user actions performed in the online system 140, or any other suitable criteria that may characterize users of the online system 140. For example, the scoring module 250 may access the user profile store 205, the action log 220, and/or the edge store 225 to identify viewing users of the online system 140 who have subscribed to content received from a content-providing user and who also satisfy a set of targeting criteria received from an entity. The scoring module 250 may then determine the number of viewing users identified and compute the influencer score associated with the content-providing user based on the number of users identified. For example, an influencer score associated with a content-providing user computed by the scoring module 250 may be proportional to a number of viewing users of the online system 140 who have subscribed to content received from the content-providing user and who also satisfy a set of targeting criteria associated with an entity having a presence on the online system 140.

In some embodiments, the scoring module 250 also may compute an influencer score associated with a content-providing user based on a value of a performance metric associated with one or more content items received from the content-providing user. In such embodiments, the scoring module 250 may identify one or more content items received from the content-providing user, in which each content item is associated with one or more items associated with an entity and/or a topic associated with the item(s). The scoring module 250 may identify each content item based on information received from the content-providing user describing the item(s) and/or topic(s), based on information included in the content item (e.g., information describing each item/topic included in a tag added to the content item or in a caption of the content item), etc. In some embodiments, the scoring module 250 may identify a content item if a probability that a region of interest within an image included in the content item corresponds to an item associated with an entity having a presence on the online system 140 is at least a threshold probability. The scoring module 250 may then determine a value of a performance metric (e.g., a click-through rate (CTR), a conversion rate, etc.) associated with each identified content item. For example, the scoring module 250 may retrieve information describing user interactions with one or more content items identified by the scoring module 250 (e.g., from the action log 220 and/or the edge store 225) and may compute a value of a performance metric associated with each content item based on the retrieved information. The scoring module 250 may then compute an influencer score associated with the content-providing user based on the value of the performance metric associated with each content item (e.g., such that the influencer score is proportional to the value of the performance metric associated with each content item).

In some embodiments, the scoring module 250 may compute an influencer score associated with a content-providing user based on multiple values. In such embodiments, the scoring module 250 may compute the influencer score associated with the content-providing user based on a number of viewing users of the online system 140 who have subscribed to content received from the content-providing user and a value of a performance metric associated with one or more content items received from the content-providing user. For example, an influencer score associated with a content-providing user may be proportional to a sum of a number of viewing users who have subscribed to content received from the content-providing user and a value of a performance metric associated with one or more content items received from the content-providing user.

Once the scoring module 250 has computed an influencer score associated with a content-providing user of the online system 140, the scoring module 250 may determine whether the score is at least a threshold score. The scoring module 250 may do so by comparing the influencer score to the threshold score and then determining whether the influencer score is at least the threshold score based on the comparison. For example, suppose that an influencer score associated with a content-providing user corresponds to a value of 62, in which the influencer score may correspond to a value between one and 100. In this example, if the threshold score corresponds to a value of 58, the scoring module 250 determines that the influencer score is at least the threshold score since 62 is equal to or greater than 58. Alternatively, in the above example, if the influencer score corresponds to a value of 56, the scoring module 250 determines that the influencer score is less than the threshold score since 56 is not equal to or greater than 58. The functionality of the scoring module 250 is further described below in conjunction with FIG. 3.

The user interface generator 255 may generate a page associated with an entity maintained in the online system 140 that includes (e.g., as shown in step 340 of FIG. 3) a content item created by a content-providing user of the online system 140. In some embodiments, the content item may be included in the page if a predicted probability that a region of interest within an image included in the content item corresponds to an item associated with the entity and if a predicted measure of quality of the image is at least a threshold measure of quality. For example, suppose that a predicted probability that a region of interest within an image included in a content item corresponds to an item associated with an entity is at least a threshold probability. In this example, if a predicted measure of quality of the image is at least a threshold measure of quality, the content item may be included among the content included in a page associated with the entity maintained in the online system 140.

In various embodiments, a page associated with an entity maintained in the online system 140 generated by the user interface generator 255 may include a feed of content items. In some embodiments, a content item may be included in the feed of content items if the content item was received from a content-providing user associated with an influencer score that is at least a threshold score. For example, the user interface generator 255 may generate a page associated with an entity maintained in the online system 140 that includes a feed of content items, in which each content item included in the feed was received from a content-providing user of the online system 140 associated with at least a threshold influencer score. In additional embodiments, a content item also may be included in the feed of content items if the content item is associated with one or more items associated with an entity having a presence on the online system 140 and/or with a topic associated with the item(s). In the above example, each content item included in the feed also includes at least one image and a predicted probability that a region of interest within the image corresponds to an item associated with the entity is at least a threshold probability. In yet additional embodiments, a content item also may be included in the feed of content items if a predicted measure of quality of the image is at least a threshold measure of quality. In the above example, a predicted measure of quality of the image included in each content item is also at least a threshold measure of quality.

In embodiments in which a page associated with an entity maintained in the online system 140 generated by the user interface generator 255 includes a feed of content items, the user interface generator 255 may arrange the content items based on information specific to a viewing user of the online system 140 to be presented with the feed of content items. In such embodiments, the content items may be arranged based on whether the viewing user has subscribed to content received from a content-providing user of the online system 140 from whom each content item included in the feed was received. For example, suppose that a viewing user of the online system 140 has subscribed to content received from one or more content-providing users of the online system 140 and that information describing each subscription is maintained in the online system 140 (e.g., in the user profile store 205, the action log 220, and/or the edge store 225). In this example, the user interface generator 255 may access this information and arrange content items included among a feed of content items to be presented to the viewing user based on whether the viewing user has subscribed to content received from a content-providing user from whom each content item was received. In the above example, content items received from content-providing users from whom the viewing user subscribed to content may be arranged in more prominent positions of the feed than other content items.

In various embodiments, a page associated with an entity maintained in the online system 140 generated by the user interface generator 255 also may include information describing one or more items associated with the entity. As described above, examples of items include products such as clothing items, electronic items, shoes, cars, or any other suitable types of items. In some embodiments, the user interface generator 255 may arrange the information within the page based on information specific to a viewing user of the online system 140 to be presented with the page. In such embodiments, the information associated with the items may be arranged within the page based on whether the viewing user has subscribed to content received from a content-providing user of the online system 140 associated with each item. For example, suppose that a viewing user of the online system 140 has subscribed to content received from one or more content-providing users of the online system 140 and that content items previously presented to the viewing user or content items with which the viewing user previously interacted depict the content-providing user(s) using one or more items associated with an entity having a presence on the online system 140. In this example, the user interface generator 255 may access information describing each subscription as well as information describing each content item (e.g., from the user profile store 205, the content store 210, the action log 220, and/or the edge store 225) and arrange information describing various items associated with the entity within a page associated with the entity based on whether the viewing user has subscribed to content received from a content-providing user associated with each item. In the above example, information describing items associated with one or more content-providing users from whom the viewing user subscribed to content may be arranged in more prominent positions of the page than information describing other items associated with the entity.

The user interface generator 255 also may generate a content item that includes a set of data that has been added (e.g., as shown in step 340 of FIG. 3) to the content item. In some embodiments, the set of data may be added to the content item if a predicted probability that a region of interest within an image included in the content item corresponds to an item associated with an entity is at least a threshold probability and if a predicted measure of quality of the image is at least a threshold measure of quality. In such embodiments, the set of data that may be added to the content item is associated with the item and/or the entity. Examples of data that may be added to a content item include data that may be included in a tag added to the content item, such as information describing an item associated with an entity, a link, or any other suitable types of data that may be included in a tag. In embodiments in which the data added to the content item includes a link, the link may correspond to a page associated with an entity maintained in the online system 140, a catalog of items maintained in the online system 140 (e.g., a catalog of products associated with an entity), or an external website (e.g., a website for an entity having a presence on the online system 140). For example, the user interface generator 255 may generate a content item that includes a tag that was added to the content item, in which the tag includes a link to a page associated with an entity maintained in the online system 140. The functionality of the user interface generator 255 is further described below in conjunction with FIG. 3.

The web server 260 links the online system 140 via the network 120 to the one or more client devices 110, as well as to the one or more third-party systems 130. The web server 260 serves web pages, as well as other content, such as JAVA®, FLASH®, XML and so forth. The web server 260 may receive and route messages between the online system 140 and the client device 110, for example, instant messages, queued messages (e.g., email), text messages, short message service (SMS) messages, or messages sent using any other suitable messaging technique. A user may send a request to the web server 260 to upload information (e.g., images or videos) that are stored in the content store 210. Additionally, the web server 260 may provide application programming interface (API) functionality to send data directly to native client device operating systems, such as IOS®, ANDROID™, WEBOS® or BlackberryOS.

Figure 3:
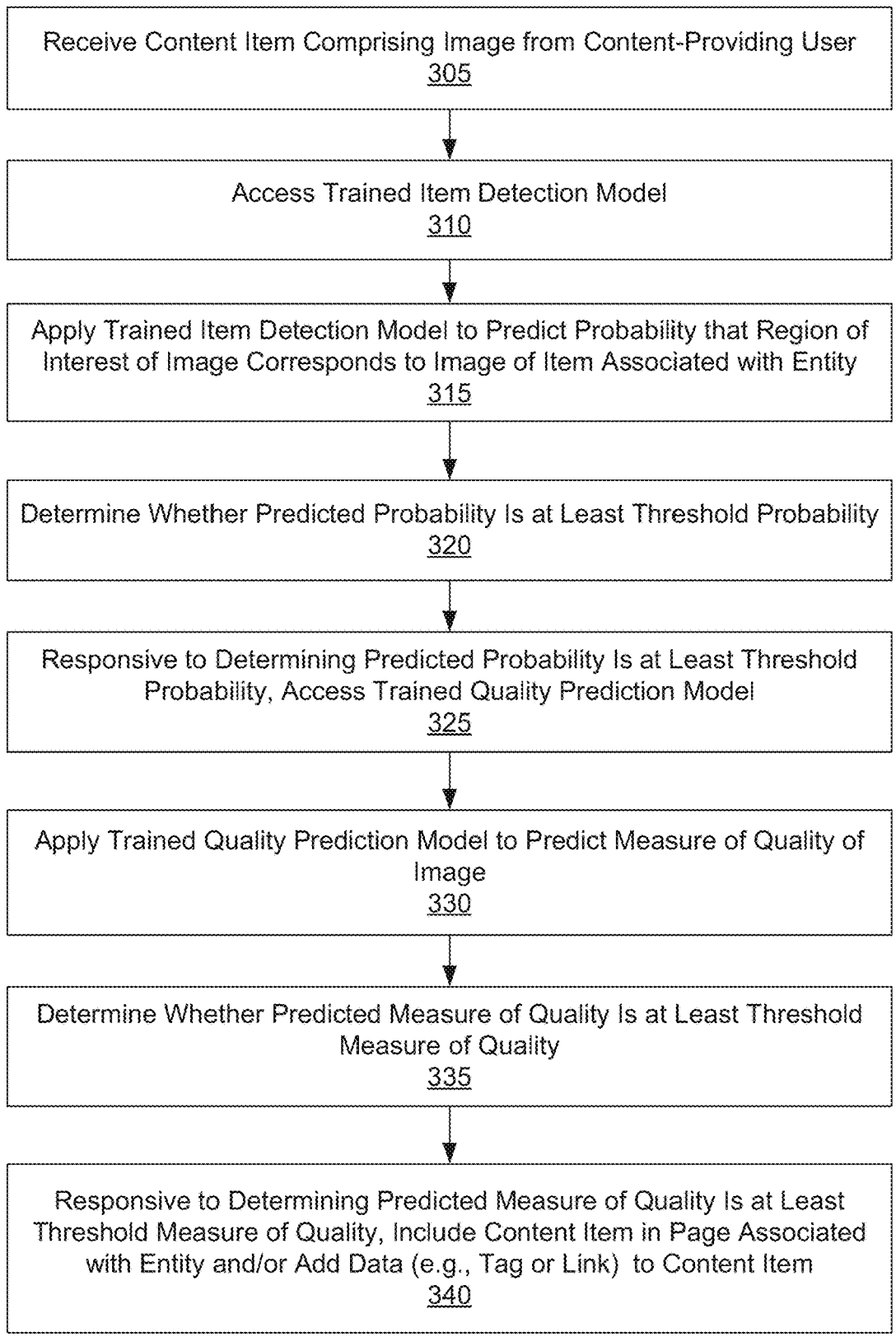
FIG. 3 is a flow chart of a method for including content created by an online system user in a page associated with an entity and/or adding data to the content based on a measure of quality of an image included in the content, in accordance with an embodiment.

Including Content Created by an Online System User in a Page Associated with an Entity and/or Adding Data to the Content Based on a Measure of Quality of an Image Included in the Content FIG. 3 is a flow chart of a method for including content created by an online system user in a page associated with an entity and/or adding data to the content based on a measure of quality of an image included in the content. In other embodiments, the method may include different and/or additional steps than those shown in FIG. 3. Additionally, steps of the method may be performed in a different order than the order described in conjunction with FIG. 3.

The online system 140 receives 305 a content item including an image from a content-providing user of the online system 140. For example, the online system 140 may receive 305 a content item including a caption and an image from the content-providing user. In some embodiments, the content item also or alternatively may include additional data such as video data, audio data, text data (e.g., in one or more tags), one or more additional images, etc. In embodiments in which the content item includes video data, the image may be included in the video data. For example, the image may be included in one or more frames of a video included in the content item received 305 from the content-providing user.

The online system 140 then accesses 310 (e.g., using the item detection module 235) a trained item detection model and applies 315 (e.g., using the item detection module 235) the item detection model to predict a probability that a region of interest within the image corresponds to an item associated with an entity having a presence on the online system 140. In some embodiments, the item detection model may be trained by the online system 140 (e.g., using the machine-learning module 230), while in other embodiments, the item detection model may be trained by a third-party system 130. To apply 315 the item detection model to predict a probability that a region of interest within the image corresponds to the item associated with the entity, the online system 140 provides an input to the item detection model that includes a set of pixel values associated with the region of interest. As described above, in some embodiments, the region of interest corresponds to a bounding box generated by the item detection model, in which the bounding box surrounds each object identified by the item detection model. Based on the set of pixel values associated with the region of interest, the item detection model predicts a probability that the region of interest corresponds to the item associated with the entity. The online system 140 then receives an output from the item detection model corresponding to the predicted probability.

In various embodiments, the online system 140 also or alternatively may access (e.g., using the item detection module 235) and apply (e.g., using the item detection module 235) the item detection model to predict a probability that one or more regions of interest within the image correspond(s) to the item associated with the entity that is being used. In various embodiments, to apply the item detection model, the online system 140 may provide an input to the item detection model that includes a set of pixel values associated with the region(s) of interest (e.g., a set of pixel values associated with a region of interest and pixels within a threshold distance of the region of interest, a set of pixel values associated with multiple regions of interest corresponding to overlapping bounding boxes, etc.). Based on the set of pixel values, the item detection model predicts a probability that the region(s) of interest correspond(s) to an item associated with an entity that is being used. In some embodiments, to apply the item detection model to predict a probability that one or more regions of interest within the image correspond(s) to the item associated with the entity that is being used, the input provided by the online system 140 also may include other types of information, such as information indicating that one or more online system users are tagged in the image, information in a caption and/or a comment associated with the content item that includes the image, etc. The online system 140 then receives an output from the item detection model corresponding to the predicted probability. In some embodiments, the online system 140 may access and apply multiple machine-learning models that collectively perform the function of the item detection model.

Once the online system 140 has applied 310 the item detection model to predict the probability that the region of interest within the image corresponds to the item associated with the entity, the online system 140 determines 320 (e.g., using the item detection module 235) whether the predicted probability is at least a threshold probability. The online system 140 may do so by comparing the predicted probability to the threshold probability and then determining 320 whether the predicted probability is at least the threshold probability based on the comparison. For example, suppose that an output received from the item prediction model corresponds to an 85.1% probability that a region of interest within the image corresponds to the item associated with the entity. In this example, if the threshold probability corresponds to an 85% probability, the online system 140 determines 320 that the predicted probability is at least the threshold probability since 85.1% is equal to or greater than 85%. Alternatively, in the above example, if the output received from the item detection model corresponds to an 84% probability, the online system 140 determines 320 that the predicted probability is less than the threshold probability since 84% is not equal to or greater than 85%. In embodiments in which the online system 140 applies the item detection model to predict the probability that one or more regions of interest within the image correspond(s) to the item associated with the entity that is being used, the online system 140 may determine whether the predicted probability is at least a threshold probability in an analogous manner.

Responsive to determining 320 that the predicted probability is at least the threshold probability, the online system 140 accesses 325 (e.g., using the quality prediction module 240) a trained quality prediction model and applies 330 (e.g., using the quality prediction module 240) the quality prediction model to predict a measure of quality of the image. In some embodiments, the quality prediction model may be trained by the online system 140 (e.g., using the machine-learning module 230), while in other embodiments, the quality prediction model may be trained by a third-party system 130. To apply 330 the quality prediction model to predict a measure of quality of the image, the online system 140 provides an input to the quality prediction model that includes a set of attributes of the image. Based on the set of attributes, the quality prediction model predicts a measure of quality of the image. The online system 140 then receives an output from the quality prediction model corresponding to the predicted measure of quality. In some embodiments, the online system 140 may access and apply multiple machine-learning models that collectively perform the function of the quality prediction model.

The measure of quality of the image may be predicted by the quality prediction model based on one or more values associated with one or more attributes of the image included in the input provided to the quality prediction model. In some embodiments, the value(s) associated with one or more attributes of the image may describe a resolution of the image, a brightness of the image, an amount of noise characterizing the image, an amount of contrast characterizing the image, an amount of distortion characterizing the image, etc. In various embodiments, the value(s) associated with one or more attributes of the image also may include a percentage of the image corresponding to the item associated with the entity and/or a number of items associated with one or more additional entities having a presence on the online system 140 included in the image. In some embodiments, a value associated with an attribute of the image may describe an amount of user engagement with a link included in the content item (e.g., a link to a page associated with an entity maintained in the online system 140). In such embodiments, the value describing the amount of user engagement with the link may be retrieved by the online system 140 (e.g., from the action log 220 and/or the edge store 225).

Figure 4:
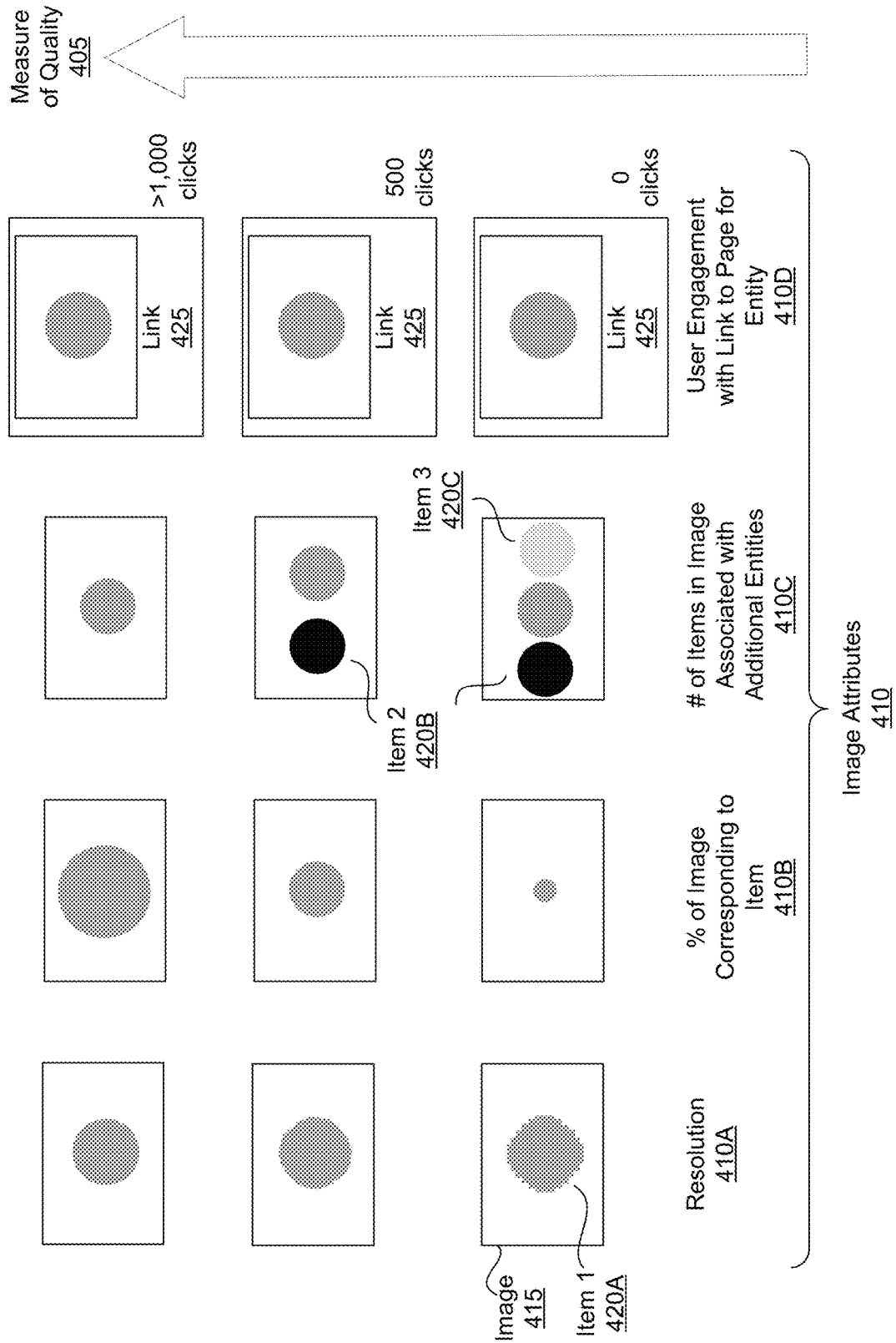
FIG. 4 illustrates examples of different attributes of an image used to predict a measure of quality of the image, in accordance with an embodiment.

In embodiments in which the measure of quality of the image is predicted based on one or more values associated with one or more attributes of the image included in an input provided to the quality prediction model, the predicted measure of quality of the image may be proportional or inversely proportional to one or more of the values. As shown in the example of FIG. 4, a measure of quality 405 of an image 415 of an item (i.e., Item 1 420A) associated with an entity having a presence on the online system 140 may be proportional or inversely proportional to values associated with different attributes 410 of the image 415. In this example, since high resolution 410A images are sharper and therefore more detailed than low resolution 410A images, the predicted measure of quality 405 of the image 415 increases as the amount of pixilation of the item 420A within the image 415 decreases. As also shown in this example, since the item 420A associated with the entity is more prominent if it occupies a greater percentage 410B of the image 415 than if it occupies a smaller percentage 410B of the image 415, the predicted measure of quality 405 of the image 415 increases as the percentage 410B of the image 415 corresponding to the item 420A associated with the entity increases. In this example, since additional items (i.e., Item 2 420B and Item 3 420C) associated with additional entities included in the image 415 may obscure or draw attention away from the item 420A associated with the entity, the predicted measure of quality 405 of the image 415 decreases as the number 410C of additional items 420B-C associated with additional entities included in the image 415 increases. As also shown in this example, if the image 415 is included in a content item 430 that also includes a link 425 to a page for the entity maintained in the online system 140, since online system users may be more likely to interact with the link 425 if the image 415 is a high-quality image, the predicted measure of quality 405 of the image 415 may increase as an amount of user engagement 410D with the link 425 (e.g., a number of clicks on the link 425) increases.

Referring back to FIG. 3, once the online system 140 has applied 330 the quality prediction model to predict the measure of quality of the image, the online system 140 determines 335 (e.g., using the quality prediction module 240) whether the predicted measure of quality is at least a threshold measure of quality. The online system 140 may do so by comparing the predicted measure of quality to the threshold measure of quality and then determining 335 whether the predicted measure of quality is at least the threshold measure of quality based on the comparison. For example, suppose that an output received from the quality prediction model corresponds to a value of a measure of quality of 75, in which the measure of quality may correspond to a value between one and 100. In this example, if the threshold measure of quality corresponds to a value of 70, the online system 140 determines 335 that the measure of quality is at least the threshold measure of quality since 75 is equal to or greater than 70. Alternatively, in the above example, if the output received by the online system 140 corresponds to a value of 65, the online system 140 determines 335 that the measure of quality is less than the threshold measure of quality since 65 is not equal to or greater than 70.

In some embodiments, if the online system 140 determines 335 that the predicted measure of quality is not at least the threshold measure of quality, the online system 140 may improve (e.g., using the image modification module 245) the measure of quality of the image. To improve the measure of quality of the image, the online system 140 may modify the image in various ways, such as by cropping a portion of the image, zooming into a portion of the image, increasing a sharpness of the image, reducing an amount of noise characterizing the image, changing one or more colors within the image, changing a brightness of the image, reducing an amount of distortion characterizing the image, etc. For example, suppose that 25% of the image corresponds to the item associated with the entity and that several additional items associated with other entities having a presence on the online system 140 also are included in the other 75% of the image. In this example, the measure of quality of the image may be improved by cropping the image to increase a percentage of the image corresponding to the image associated with the entity while also reducing the number of additional items associated with the other entities included in the image (e.g., by cropping out as many of the additional items as possible). In this example, once the image has been cropped, the measure of quality of the image also may be improved by increasing a sharpness of the image. In some embodiments, once the online system 140 has improved the measure of quality of the image, the online system 140 may repeat some of the steps described above (e.g., by proceeding back to the applying 330 the quality prediction model to predict a measure of quality of the image step, etc.).

Responsive to determining 335 that the predicted measure of quality is at least the threshold measure of quality, the online system 140 may include 340 the content item in a page associated with the entity maintained in the online system 140. The online system 140 may include 340 the content item in the page by generating (e.g., using the user interface generator 255) the page to include 340 the content item. For example, suppose that the predicted probability that the region of interest within the image included in the content item corresponds to the item associated with the entity is at least the threshold probability. In this example, if the predicted measure of quality of the image is at least the threshold measure of quality, the content item may be included 340 among the content included in the page associated with the entity maintained in the online system 140. In some embodiments, the online system 140 may include 340 the content item in the page automatically in response to determining 335 that the predicted measure of quality is at least the threshold measure of quality, while in other embodiments, the content item may be included 340 in the page manually (e.g., in response to receiving a request from the entity to include the content item in the page).

In various embodiments, the page also may include information describing one or more items associated with the entity. As described above, examples of items include products such as clothing items, electronic items, shoes, cars, or any other suitable types of items. In some embodiments, the online system 140 may arrange (e.g., using the user interface generator 255) the information within the page based on information specific to a viewing user of the online system 140 to be presented with the page. In such embodiments, the information associated with the items may be arranged within the page based on whether the viewing user has subscribed to content received from a content-providing user of the online system 140 associated with each item. For example, suppose that a viewing user of the online system 140 to be presented with the page has subscribed to content received from one or more content-providing users of the online system 140 and that content items previously presented to the viewing user or content items with which the viewing user previously interacted depict the content-providing user(s) using one or more items associated with the entity. In this example, the online system 140 may access information describing each subscription as well as information describing each content item (e.g., from the user profile store 205, the content store 210, the action log 220, and/or the edge store 225) and arrange information describing various items associated with the entity within the page based on whether the viewing user has subscribed to content received from a content-providing user associated with each item. In the above example, information describing items associated with one or more content-providing users from whom the viewing user subscribed to content may be arranged in more prominent positions of the page than information describing other items associated with the entity.

In various embodiments, the page associated with the entity may include a feed of content items. In some embodiments, the content item received 305 from the content-providing user may be included in the feed of content items if an influencer score associated with the content-providing user is at least a threshold score. For example, the online system 140 may generate the page associated with the entity maintained in the online system 140 that includes a feed of content items, in which each content item included in the feed was received from a content-providing user of the online system 140 associated with at least a threshold influencer score. In additional embodiments, the content item received 305 from the content-providing user also may be included in the feed of content items if the content item is associated with one or more items associated with the entity and/or with a topic associated with the item(s). In the above example, each content item included in the feed also includes at least one image and a predicted probability that a region of interest within the image corresponds to an item associated with the entity is at least a threshold probability. In yet additional embodiments, the content item received 305 from the content-providing user also may be included in the feed of content items if the predicted measure of quality of the image is at least the threshold measure of quality. In the above example, a predicted measure of quality of the image included in each content item is also at least a threshold measure of quality.

The online system 140 may compute (e.g., using the scoring module 250) the influencer score associated with the content-providing user. The influencer score may indicate a measure of influence that the content-providing user has to drive traffic within the online system 140. In some embodiments, the online system 140 may compute the influencer score associated with the content-providing user if the item detection model has predicted the probability that a region of interest within the image included in the content item received 305 from the content-providing user corresponds to the item associated with the entity and if the online system 140 has determined 320 that the predicted probability is at least the threshold probability.

To compute the influencer score associated with the content-providing user, the online system 140 may identify one or more viewing users of the online system 140 who have subscribed to content received from the content-providing user. In some embodiments, the online system 140 may only identify viewing users who satisfy a set of targeting criteria received from the entity specifying an audience for content associated with the entity. Targeting criteria may include demographic information, information describing hobbies/interests, information describing user actions performed in the online system 140, or any other suitable criteria that may characterize users of the online system 140. For example, the online system 140 may access the user profile store 205, the action log 220, and/or the edge store 225 to identify viewing users of the online system 140 who have subscribed to content received from the content-providing user and who also satisfy a set of targeting criteria received from the entity. The online system 140 may then determine the number of viewing users identified and compute the influencer score associated with the content-providing user based on the number of users identified. For example, the influencer score associated with the content-providing user computed by the online system 140 may be proportional to a number of viewing users of the online system 140 who have subscribed to content received from the content-providing user and who also satisfy a set of targeting criteria associated with the entity.

In some embodiments, the online system 140 also may compute the influencer score associated with the content-providing user based on a value of a performance metric associated with one or more content items received from the content-providing user. In such embodiments, the online system 140 may identify one or more content items received from the content-providing user, in which each content item is associated with one or more items associated with the entity and/or a topic associated with the item(s). The online system 140 may identify each content item based on information received from the content-providing user describing the item(s) and/or topic(s), based on information included in the content item (e.g., information describing each item/topic and a name of the entity included in a tag added to the content item or in a caption of the content item), etc. In some embodiments, the online system 140 may identify the content item received 305 from the content-providing user if the online system 140 has determined 320 that the probability that a region of interest within the image corresponds to an item associated with the entity is at least the threshold probability. The online system 140 may then determine a value of a performance metric (e.g., a click-through rate (CTR), a conversion rate, etc.) associated with each identified content item. For example, the online system 140 may retrieve information describing user interactions with one or more content items identified by the online system 140 (e.g., from the action log 220 and/or the edge store 225) and may compute a value of a performance metric associated with each content item based on the retrieved information. The online system 140 may then compute the influencer score associated with the content-providing user based on the value of the performance metric associated with each content item (e.g., such that the influencer score is proportional to the value of the performance metric associated with each content item).

In some embodiments, the online system 140 may compute the influencer score associated with the content-providing user based on multiple values. In such embodiments, the online system 140 may compute the influencer score associated with the content-providing user based on a number of viewing users of the online system 140 who have subscribed to content received from the content-providing user and a value of a performance metric associated with one or more content items received from the content-providing user. For example, the influencer score associated with the content-providing user may be proportional to a sum of a number of viewing users who have subscribed to content received from the content-providing user and a value of a performance metric associated with one or more content items received from the content-providing user.

Once the online system 140 has computed the influencer score associated with the content-providing user, the online system 140 may determine whether the score is at least a threshold score. The online system 140 may do so by comparing the influencer score to the threshold score and then determining whether the influencer score is at least the threshold score based on the comparison. For example, suppose that the influencer score associated with the content-providing user corresponds to a value of 62, in which the influencer score may correspond to a value between one and 100. In this example, if the threshold score corresponds to a value of 58, the online system 140 determines that the influencer score is at least the threshold score since 62 is equal to or greater than 58. Alternatively, in the above example, if the influencer score corresponds to a value of 56, the online system 140 determines that the influencer score is less than the threshold score since 56 is not equal to or greater than 58.

Responsive to determining 335 that the predicted measure of quality is at least the threshold measure of quality, the online system 140 also or alternatively may add 340 a set of data to the content item. The online system 140 may add 340 the set of data to the content item by generating (e.g., using the user interface generator 255) the content item to include the set of data. In some embodiments, the set of data that may be added 340 to the content item is associated with the item associated with the entity and/or the entity. Examples of data that may be added 340 to the content item include data that may be included in a tag added to the content item, such as information describing the item associated with the entity, a link, or any other suitable types of data that may be included in a tag added to the content item. In embodiments in which the data added 340 to the content item includes a link, the link may correspond to a page associated with the entity maintained in the online system 140, a catalog of items maintained in the online system 140 (e.g., a catalog of products associated with the entity), or an external website (e.g., a website for the entity). For example, the online system 140 may generate the content item to include a tag that was added to the content item, in which the tag includes a link to the page associated with the entity maintained in the online system 140. In some embodiments, the online system 140 may add 340 the set of data to the content item automatically in response to determining 335 that the predicted measure of quality is at least the threshold measure of quality, while in other embodiments, the set of data may be added 340 to the content item manually (e.g., in response to receiving a request from the entity and/or the content-providing user to add 340 the data to the content item).

In embodiments in which the page associated with the entity includes a feed of content items, the online system 140 may arrange (e.g., using the user interface generator 255) the content items based on information specific to a viewing user of the online system 140 to be presented with the feed of content items. In such embodiments, the content items may be arranged based on whether the viewing user has subscribed to content received from a content-providing user of the online system 140 from whom each content item included in the feed was received. For example, suppose that a viewing user of the online system 140 to whom a feed of content items included in the page is to be presented has subscribed to content received from one or more content-providing users of the online system 140 and that information describing each subscription is maintained in the online system 140 (e.g., in the user profile store 205, the action log 220, and/or the edge store 225). In this example, the online system 140 may access this information and arrange content items included among the feed of content items based on whether the viewing user has subscribed to content received from a content-providing user from whom each content item was received. In the above example, content items received from content-providing users from whom the viewing user subscribed to content may be arranged in more prominent positions of the feed than other content items.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a content item comprising an image from a content-providing user of an online system;
identifying a region of interest within the image that depicts an object;
predicting a probability that the object depicted by the region of interest corresponds to an item associated with an entity having a presence on the online system, wherein the probability is predicted by applying an item detection model to a set of pixel values from the image corresponding to the region of interest, wherein the item detection model is a machine-learning model that is trained to predict a probability that a region of interest within an image depicts the item associated with the entity;
determining whether the predicted probability exceeds threshold probability;
responsive to determining that the predicted probability exceeds the threshold probability, predicting a measure of quality of the image by applying a quality prediction model to the image, wherein the quality prediction model is a machine-learning model trained to predict a measure of quality of an image based on the image and a set of attributes of the image;
determining whether the predicted measure of quality exceeds a threshold measure of quality; and
responsive to determining that the predicted measure of quality exceeds the threshold measure of quality, adding a set of data to the content item, wherein the set of data is associated with the item and the entity.

2. The method of claim 1, wherein the set of data added to the content item comprises one or more selected from the group consisting of: a tag describing the item, a link to the page associated with the entity maintained in the online system, and a catalog of items associated with the entity maintained in the online system.

3. The method of claim 1, further comprising:
responsive to determining that the predicted measure of quality is less than the threshold measure of quality, improving the measure of quality of the image.

4. The method of claim 3, wherein improving the measure of quality of the image comprises one or more selected from the group consisting of: cropping a portion of the image, zooming into a portion of the image, increasing a sharpness of the image, reducing an amount of noise characterizing the image, changing one or more colors within the image, changing a brightness of the image, and reducing an amount of distortion characterizing the image.

5. The method of claim 1, wherein the different measures of quality of the additional set of images are based at least in part on one or more selected from the group consisting of: a resolution of each of the additional set of images, a percentage of each of the additional set of images corresponding to an item associated with the entity, a number of items associated with one or more additional entities having a presence on the online system comprising each of the additional set of images, and an amount of user engagement with a link to the page associated with the entity maintained in the online system, wherein the link comprises a content item comprising each of the additional set of images.

6. The method of claim 5, wherein the predicted measure of quality of the image is based at least in part on one or more selected from the group consisting of: a resolution of the image, a percentage of the image corresponding to the item associated with the entity, a number of items associated with the one or more additional entities having a presence on the online system comprising the image, and an amount of user engagement with a link to the page associated with the entity maintained in the online system, wherein the link comprises the content item received from the content-providing user.

7. The method of claim 6, wherein the predicted measure of quality is proportional to one or more of: the resolution of the image, the percentage of the image corresponding to the item associated with the entity, and the amount of user engagement with the link to the page associated with the entity maintained in the online system, wherein the link comprises the content item received from the content-providing user.

8. The method of claim 6, wherein the predicted measure of quality is inversely proportional to the number of items associated with the one or more additional entities having a presence on the online system comprising the image.

9. The method of claim 1, further comprising:
responsive to determining that the predicted probability exceeds the threshold probability:
identifying one or more viewing users of the online system subscribing to content received from the content-providing user, wherein the one or more viewing users satisfy a set of targeting criteria received from the entity;
determining a number of the one or more viewing users subscribing to the content received from the content-providing user;
determining a value of a performance metric associated with one or more content items received from the content-providing user, wherein the one or more content items are associated with one or more of: one or more items associated with the entity and a topic associated with the one or more items; and
computing an influencer score associated with the content-providing user based at least in part on one or more of: the number of the one or more viewing users subscribing to the content received from the content-providing user and the value of the performance metric.

10. The method of claim 9, further comprising:
determining whether the influencer score associated with the content-providing user exceeds a threshold score;
responsive to determining the influencer score associated with the content-providing user exceeds the threshold score, generating a feed of content comprising the content item and a set of additional content items received from the content-providing user, wherein each of the set of additional content items is associated with one or more of: the one or more items associated with the entity and a topic associated with the one or more items; and
including the feed of content in the page associated with the entity maintained in the online system.

11. A computer program product comprising a non-transitory computer readable storage medium having instructions encoded thereon that, when executed by a processor, cause the processor to:
receive a content item comprising an image from a content-providing user of an online system;
identify a region of interest within the image that depicts an object;
predict a probability that the object depicted by the region of interest corresponds to an item associated with an entity having a presence on the online system, wherein the probability is predicted by applying an item detection model to a set of pixel values from the image corresponding to the region of interest, wherein the item detection model is a machine-learning model that is trained to predict a probability that a region of interest within an image depicts the item associated with the entity;
determine whether the predicted probability exceeds a threshold probability;
responsive to determining that the predicted probability exceeds the threshold probability, predict a measure of quality of the image by applying a quality prediction model to the image, wherein the quality prediction model is a machine-learning model trained to predict a measure of quality of an image based on the image and a set of attributes of the image;
determine whether the predicted measure of quality exceeds a threshold measure of quality; and
responsive to determining that the predicted measure of quality exceeds the threshold measure of quality, add a set of data to the content item, wherein the set of data is associated with the item and the entity.

12. The computer program product of claim 11, wherein the set of data added to the content item comprises one or more selected from the group consisting of: a tag describing the item, a link to the page associated with the entity maintained in the online system, and a catalog of items associated with the entity maintained in the online system.

13. The computer program product of claim 11, wherein the computer-readable storage medium further has instructions encoded thereon that, when executed by the processor, cause the processor to:
responsive to determining that the predicted measure of quality is less than the threshold measure of quality, improve the measure of quality of the image.

14. The computer program product of claim 13, wherein improve the measure of quality of the image comprises one or more selected from the group consisting of: cropping a portion of the image, zooming into a portion of the image, increasing a sharpness of the image, reducing an amount of noise characterizing the image, changing one or more colors within the image, changing a brightness of the image, and reducing an amount of distortion characterizing the image.

15. The computer program product of claim 11, wherein the different measures of quality of the additional set of images are based at least in part on one or more selected from the group consisting of: a resolution of each of the additional set of images, a percentage of each of the additional set of images corresponding to an item associated with the entity, a number of items associated with one or more additional entities having a presence on the online system comprising each of the additional set of images, and an amount of user engagement with a link to the page associated with the entity maintained in the online system, wherein the link comprises a content item comprising each of the additional set of images.

16. The computer program product of claim 15, wherein the predicted measure of quality of the image is based at least in part on one or more selected from the group consisting of: a resolution of the image, a percentage of the image corresponding to the item associated with the entity, a number of items associated with the one or more additional entities having a presence on the online system comprising the image, and an amount of user engagement with a link to the page associated with the entity maintained in the online system, wherein the link comprises the content item received from the content-providing user.

17. The computer program product of claim 16, wherein the predicted measure of quality is proportional to one or more of: the resolution of the image, the percentage of the image corresponding to the item associated with the entity, and the amount of user engagement with the link to the page associated with the entity maintained in the online system, wherein the link comprises the content item received from the content-providing user.

18. The computer program product of claim 16, wherein the predicted measure of quality is inversely proportional to the number of items associated with the one or more additional entities having a presence on the online system comprising the image.

19. The computer program product of claim 11, wherein the computer-readable storage medium further has instructions encoded thereon that, when executed by the processor, cause the processor to:
responsive to determining that the predicted probability exceeds the threshold probability:
identify one or more viewing users of the online system subscribing to content received from the content-providing user, wherein the one or more viewing users satisfy a set of targeting criteria received from the entity;
determine a number of the one or more viewing users subscribing to the content received from the content-providing user;
determine a value of a performance metric associated with one or more content items received from the content-providing user, wherein the one or more content items are associated with one or more of: one or more items associated with the entity and a topic associated with the one or more items; and
compute an influencer score associated with the content-providing user based at least in part on one or more of: the number of the one or more viewing users subscribing to the content received from the content-providing user and the value of the performance metric.

20. The computer program product of claim 19, wherein the computer-readable storage medium further has instructions encoded thereon that, when executed by the processor, cause the processor to:
determine whether the influencer score associated with the content-providing user exceeds a threshold score;
responsive to determining the influencer score associated with the content-providing user exceeds the threshold score, generate a feed of content comprising the content item and a set of additional content items received from the content-providing user, wherein each of the set of additional content items is associated with one or more of: the one or more items associated with the entity and a topic associated with the one or more items; and
include the feed of content in the page associated with the entity maintained in the online system.

* * * * *